United States Patent
Egan

(10) Patent No.: US 12,326,769 B2
(45) Date of Patent: *Jun. 10, 2025

(54) SELECTIVELY USING HEROIC DATA RECOVERY METHODS IN A MEMORY DEVICE

(71) Applicant: Micron Technology, Inc., Boise, ID (US)

(72) Inventor: Curtis W. Egan, Brighton, CO (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/421,389

(22) Filed: Jan. 24, 2024

(65) Prior Publication Data
US 2024/0160266 A1 May 16, 2024

Related U.S. Application Data

(63) Continuation of application No. 17/886,987, filed on Aug. 12, 2022, now Pat. No. 11,914,442.

(51) Int. Cl.
*G06F 1/30* (2006.01)
*G06F 11/14* (2006.01)

(52) U.S. Cl.
CPC ............ *G06F 1/30* (2013.01); *G06F 11/1415* (2013.01)

(58) Field of Classification Search
CPC .............................. G06F 1/30; G06F 11/1415
USPC .......................................................... 714/14
See application file for complete search history.

(56) References Cited

U.S. PATENT DOCUMENTS

| | | | |
|---|---|---|---|
| 8,607,124 B2* | 12/2013 | Weingarten | G11C 16/26 365/185.24 |
| 8,638,602 B1 | 1/2014 | Horn | |
| 2008/0077841 A1 | 3/2008 | Gonzalez et al. | |
| 2014/0068384 A1* | 3/2014 | Kwak | G06F 11/1068 714/773 |
| 2015/0089325 A1 | 3/2015 | Chandrasekhar et al. | |
| 2016/0055057 A1* | 2/2016 | Shin | G06F 11/1012 714/764 |
| 2023/0153201 A1* | 5/2023 | Oh | G11C 29/021 714/764 |

* cited by examiner

*Primary Examiner* — James C Kerveros
(74) *Attorney, Agent, or Firm* — Schwegman Lundberg & Woessner, P.A.

(57) ABSTRACT

A block storing corrupt data is detected. Based on detecting the block storing corrupt data, threshold voltage ($V_T$) distribution data corresponding to the block is accessed. The $V_T$ distribution data comprises one or more $V_T$ distribution measurements corresponding to the block. The $V_T$ distribution data corresponding to the block is compared with reference $V_T$ distribution data. The reference $V_T$ distribution data comprises one or more reference $V_T$ distributions. Based on a result of the comparison, it is determined whether to perform one or more heroic data recovery processes on the block.

20 Claims, 6 Drawing Sheets

SELECTIVELY USING HEROIC DATA RECOVERY METHODS IN A MEMORY DEVICE

PRIORITY APPLICATION

This application is a continuation of U.S. application Ser. No. 17/886,987, filed Aug. 12, 2022, which is incorporated herein by reference in its entirety.

TECHNICAL FIELD

Embodiments of the disclosure relate generally to memory sub-systems and more specifically to selectively using heroic data recovery methods in a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
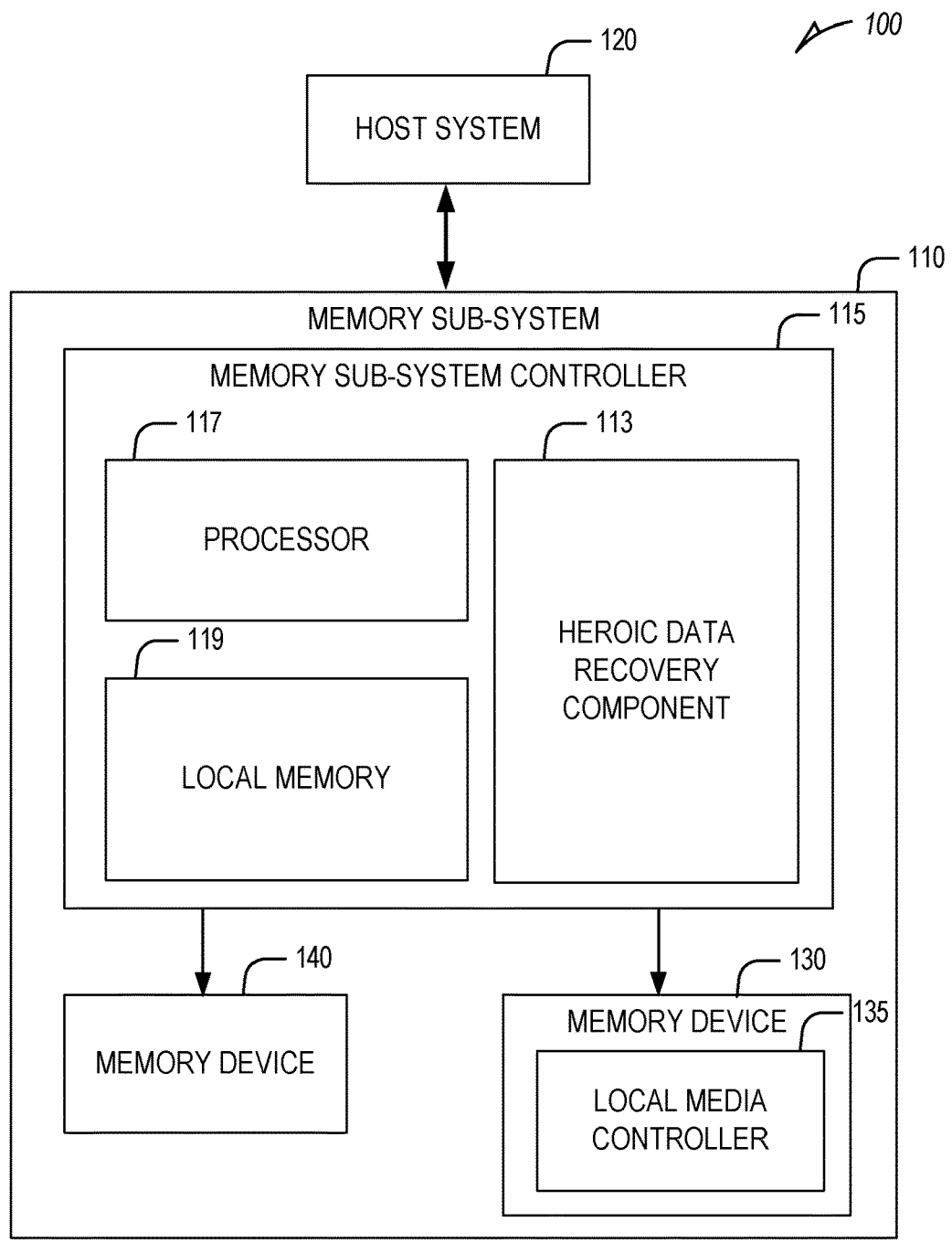
FIG. 1 is a block diagram illustrating an example computing system that includes a memory sub-system, in accordance with some embodiments of the present disclosure.

Aspects of the present disclosure are directed to an approach to selectively performing heroic data recovery methods at a memory device in a memory sub-system. A memory sub-system can be a storage device (e.g., solid-state drive (SSD)), a memory module, or a combination of a storage device and memory module. Examples of other storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1. A NAND memory device can include multiple NAND dies. Each die may include one or more planes and each plane includes multiple blocks. Each block includes an array that includes pages (rows) and strings (columns). A string includes a plurality of memory cells connected in series. A memory cell ("cell") is an electronic circuit that stores information. Depending on the cell type, a cell can store one or more bits of binary information and has various logic states that correlate to the number of bits being stored. The logic states can be represented by binary values, such as "0" and "1," or combinations of such values.

Various memory access operations can be performed on the memory cells. Data can be written to, read from, and erased from memory cells. Memory cells can be grouped into a write unit, such as a page. For some types of memory devices, a page is the smallest write unit. A page size represents a particular number of cells of a page. For some types of memory devices (e.g., NAND), memory cells can be grouped into an erase unit, such as a block. Data can be written to a block, page-by-page. Data can be erased at a block level. However, portions of a block cannot be erased.

Occasionally data stored by a memory device becomes corrupt and as a result, the data is not able to be unable to read from the memory device. Reasons for data becoming corrupt vary and can include irregularities or defects in the physical medium on which the data is stored, loss of correspondence between the write mechanism and the read mechanism, or exposure of the data as stored on the medium to adverse environmental conditions. Regardless of the reason for the data becoming corrupt, data recovery processes are typically performed to recover the data to avoid data loss.

A standard data recovery technique includes storing the data with an Error Correction Code (ECC). The ECC is derived from a predetermined algorithm, in which actual stored data values are used as the values of variables in the algorithm to produce the ECC. When corrupt data is detected, a corresponding ECC is used to recover the lost data values to a limited extent. The extent to which standard data recovery technique such as ECC can successfully recover corrupt data depends on many factors and as such, standard data recovery techniques are limited.

When the level of data corruption is too great for standard data recovery techniques to be successful, "heroic" data recovery techniques are used in an attempt to recover the data. As used herein, "heroic data recovery" refers to measures above and beyond standard data recovery techniques such as ECC. Heroic data recovery techniques are also typically much more time intensive than standard recovery techniques. An example of a heroic data recovery technique includes retrying a read operation one or more times using adjusted voltage reference values. Other examples of heroic data recovery techniques include Single Bit Soft Bit Error Recovery (SBSBER) methods with multiple soft-bit and hard-bit attempts. Generally, heroic data recovery techniques take longer and utilize more computational resources than standard data recovery methods and are often unsuccessful. Hence, employing heroic data recovery techniques can often be a waste of time and resources.

Aspects of the present disclosure address the forgoing issues with heroic data recovery by selectively performing heroic data recovery when standard data recovery techniques are unsuccessful. Consistent with some embodiments, based on standard data recovery processes being unsuccessful in recovering corrupt data on a block of a memory device, a heroic data recovery component of a memory sub-system accesses and analyzes threshold voltage ($V_T$) distribution data corresponding to the block to determine whether to perform heroic data recovery processes.

The $V_T$ distribution data comprises one or more $V_T$ distribution measurements corresponding to the block. Accordingly, the $V_T$ distribution data corresponding to the block is referred to as "measured $V_T$ distribution data." The heroic data recovery component compares the measured $V_T$ distribution data with reference $V_T$ distribution data. The reference $V_T$ distribution data includes one or more reference $V_T$ distributions that indicate that heroic data recovery processes are likely to be successful (e.g., based on historical analysis of $V_T$ distribution data and successful heroic data recovery attempts). The heroic data recovery component determines whether to perform one or more heroic data recovery processes based on a result of the comparison.

For some embodiments, in comparing the measured $V_T$ distribution data with the reference $V_T$ distribution data, the heroic data recovery component uses a correlation function to determine a statistical correlation between the measured $V_T$ distribution data and the reference $V_T$ distribution data. Consistent with these embodiments, the heroic data recovery component determines whether to perform the one or more heroic data recovery processes based on the statistical correlation (e.g., based on whether the statistical correlation exceeds a threshold correlation). The heroic data recovery component may adjust one or more reference voltages used to determine stored values during a read operation based on the statistical correlation, which may, for some embodiments, be performed as part of performing heroic data recovery processes.

By selectively performing heroic data recovery in this manner, this approach enables the memory sub-systems to save time and reduce utilization of computational resources by avoiding performance of expense heroic data recovery techniques in instances in which they are likely to be unsuccessful.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a host interface. Examples of a host interface include, but are not limited to, a SATA interface, a PCIe interface, USB interface, Fibre Channel, Serial Attached SCSI (SAS), Small Computer System Interface (SCSI), a double data rate (DDR) memory bus, a DIMM interface (e.g., DIMM socket interface that supports DDR), Open NAND Flash Interface (ONFI), DDR, Low Power Double Data Rate (LPDDR), or any other interface. The host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and 3D NAND.

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. For example, the memory device can include a set of blocks. Design specifications may define a constraint on a minimum number of valid blocks for the memory device 130 that may be different from the number of blocks in the set of blocks on the device.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

A memory sub-system controller 115 (or controller 115, for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controllers 135 that operate in conjunction with memory sub-system controller 115 to execute operations on one or more memory cells of the memory devices 130.

The memory sub-system 110 also includes a heroic data recovery component 113 responsible for performing heroic data recovery processes, including determining when to perform heroic data recovery processes. Based on standard data recovery processes being unsuccessful in recovering corrupt data stored by the memory device 130 or 140, the heroic data recovery component 113 determines whether to perform heroic data recovery processes based on an analysis of measured $V_T$ distribution data comprising one or more $V_T$ distribution measurements corresponding to a block on which the corrupt data is stored. The heroic data recovery component 113 compares the measured $V_T$ distribution data with reference $V_T$ distribution data that includes one or more reference $V_T$ distributions that indicate when heroic data recovery processes are likely to be successful (e.g., based on historical analysis of $V_T$ distribution data and successful heroic data recovery attempts). The heroic data recovery component 113 determines whether to perform one or more heroic data recovery processes based on a result of the comparison. As an example, the heroic data recovery component 113 can determine a statistical correlation between the measured $V_T$ distribution data and the reference $V_T$ distribution data and determine whether to perform one or more heroic data recovery processes based on the statistical correlation. Further details regarding the functionality of the heroic data recovery component 113 are discussed below.

In some embodiments, the memory sub-system controller 115 includes at least a portion of the heroic data recovery component 113. For example, the memory sub-system controller 115 can include a processor 117 (processing device) configured to execute instructions stored in local memory 119 for performing the operations described herein. In some embodiments, the heroic data recovery component 113 is part of the host system 120, an application, or an operating system. In some embodiments, the local media controller 135 includes at least a portion of the heroic data recovery component 113.

Figure 2:
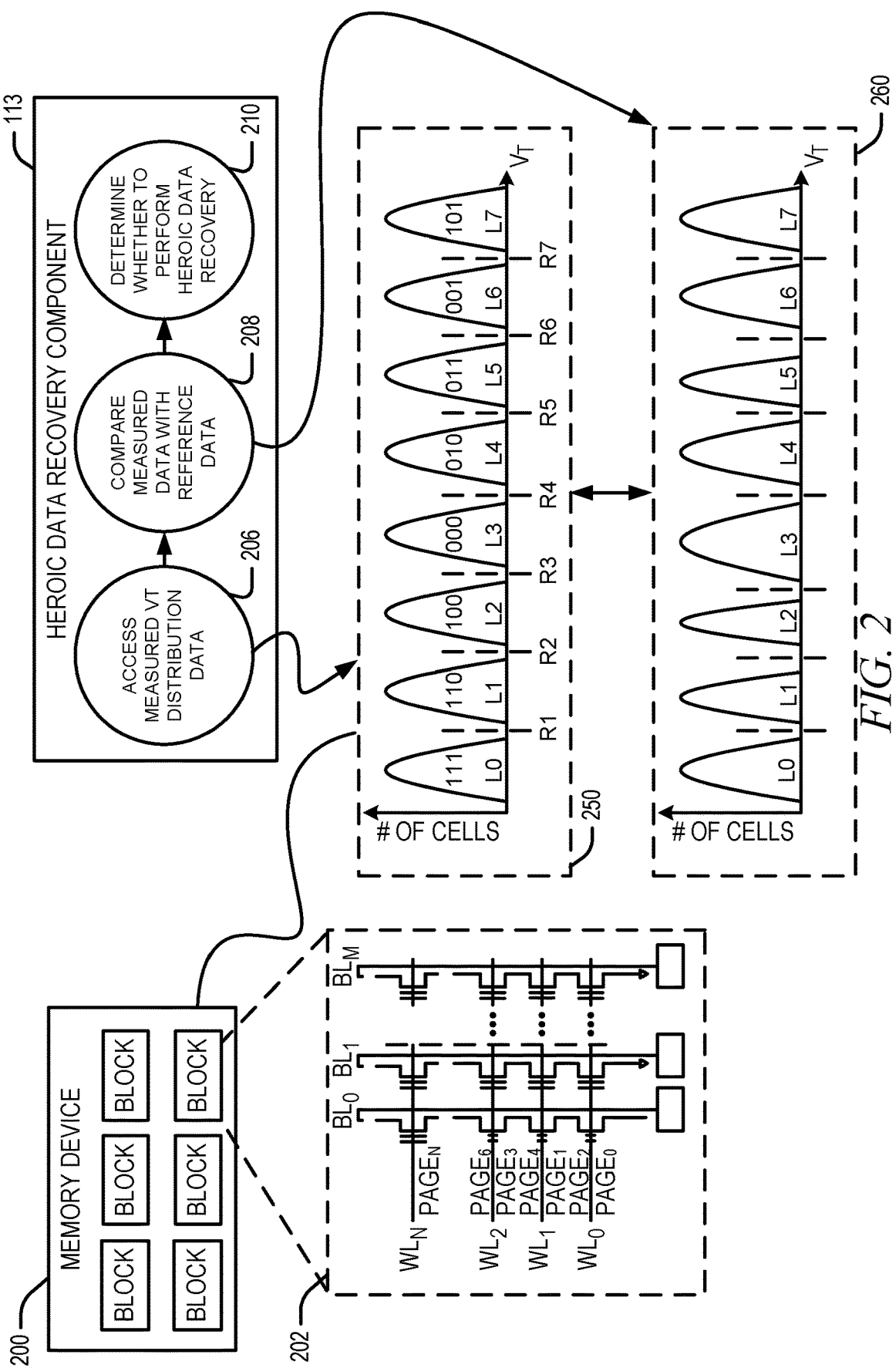
FIG. 2 is conceptual diagrams illustrating example interactions between components of a memory sub-system in selectively performing heroic data recovery processes in a memory device, in accordance with some embodiments of the present disclosure.

FIG. 2 is conceptual diagrams illustrating example interactions between components of a memory sub-system in selectively performing heroic data recovery processes in a memory device, in accordance with some embodiments of the present disclosure. In the example illustrated in FIG. 2, the memory device 200 is an example memory device 130 in the example form of a NAND memory device. The memory device 200 may include multiple NAND dies. Each die may include one or more planes and each plane includes multiple blocks (e.g., block 202). Each block includes a 2D array that includes including pages (rows) and strings (columns). A string includes a plurality of memory cells connected in series. Each memory cell is used to represent one or more bit values.

A single NAND flash cell includes a transistor that stores an electric charge on a memory layer that is isolated by oxide insulating layers above and below. Within each cell, data is stored as the threshold voltage of the transistor. SLC NAND, for example, can store one bit per cell. Other types of memory cells, such as MLCs, TLCs, QLCs, and PLCs, can store multiple bits per cell. Strings are connected within a NAND block allow storage and retrieval of data from selected cells. NAND cells in the same column are connected in series to form a bit line (BL). All cells in a bit line are connected to a common ground on one end and a common sense amplifier on the other for reading the threshold voltage of one of the cells when decoding data. NAND cells are connected horizontally at their control gates to a word line (WL) to form a page. In MLC, TLC, QLC, and PLC NAND, a page is a set of connected cells that share the same word line and is the minimum unit to program.

As noted above, each NAND cell stores data in the form of the threshold voltage ($V_T$) of the transistor. The range of threshold voltages of a memory cell is divided into a number of regions based on the number of bits stored by the cell and each region corresponds to a value that can be represented by the cell. More specifically, each region corresponds to a charge level and each charge level decodes into a multi-bit value. For example, a TLC NAND flash cell can be at one of eight charge levels: L0, L1, L2, L3, L4, L5, L6, or L7. Each charge level decodes into a 3-bit value that is stored in the flash cell (e.g., 111, 110, 100, 000, 010, 011, 001, and 101). As an example, graph 250 comprises a plot of $V_T$ distribution data for the block 202. The graph 250 illustrates that a TLC NAND flash cell can be at one of eight charge levels—L0, L1, L2, L3, L4, L5, L6, or L7 and each charge level decodes into a 3-bit value that is stored in the flash cell.

During each programming step, data is programmed into a block of the memory device 200 using a programming sequence that includes multiple passes in which programming pulses are applied to cells in the block. Over the multiple passes, the programming pulses configure the threshold voltages of the cells in each page of the block according to a target charge level based on the value the cells are intended to represent. As the programming sequence progresses, the voltage level of the programming pulses increase until the threshold voltages of the cells reach the target charge level. During a read operation, a set of read reference voltages are applied to cells being read to determine a value of data stored in the cells. As an example, graph 250 includes an indication of locations of read reference voltages R1-R7 that may be applied to TLC NAND flash cells to identify value stored thereon during a read operation. The location of each read reference voltage (i.e., the value of each read reference voltage) is determined by system settings maintained by the memory sub-system controller 115.

Upon detecting the block 202 storing corrupt data, the memory sub-system memory sub-system controller 115 attempts standard data recovery processes on the block 202. Based on the standard data recovery processes being unsuccessful, the heroic data recovery component 113 determines whether to perform one or more heroic data recovery processes on the block 202.

In determining whether to perform heroic data recovery processes, the heroic data recovery component 113 accesses accessing threshold voltage ($V_T$) distribution data corresponding to the block 202, at operation 206. The $V_T$ distribution data comprises one or more $V_T$ distribution measurements corresponding to the block 202. Accordingly, the $V_T$ distribution data corresponding to the block is also referred to herein as "measured $V_T$ distribution data." The processing device may, for example, access the $V_T$ distribution data from a log of $V_T$ distribution data generated during normal operation of the memory device. Graph 250 illustrates an example of the $V_T$ distribution data corresponding to the block 202. More specifically, the graph 250 includes a set of $V_T$ distribution and each $V_T$ distribution corresponds to a charge level.

The heroic data recovery component 113 performs a comparison of the $V_T$ distribution data corresponding to the block 202 with reference $V_T$ distribution data (operation 208). The reference $V_T$ distribution data includes one or more reference $V_T$ distributions that indicate a likelihood of success of heroic data recovery processes (e.g., whether heroic data recovery is likely to be successful or unsuccessful based on historical analysis). Graph 260 illustrates an example of the reference $V_T$ distribution data. The reference $V_T$ distribution data may correspond to a likelihood that heroic data recovery is likely to be unsuccessful. That is, the more similar or more correlated the measured $V_T$ distribution data is with the reference $V_T$ distribution data, the less likely that heroic data recovery processes will be successful for the block 202.

In comparing measured $V_T$ distribution data with reference $V_T$ distribution data, the heroic data recovery component 113 may determine a correlation or similarity between any one or more of: distribution shapes, distribution peaks, and valley margins in the distributions. As used herein, "valley margin" refers to a margin between the $V_T$ distributions of two consecutive charge levels (e.g., the margin between the L1 $V_T$ distributions and the L2 $V_T$ distribution). For some embodiments, in comparing the measured $V_T$ distribution data with the reference $V_T$ distribution data, the heroic data recovery component 113 uses a correlation function to determine a statistical correlation between the measured $V_T$ distribution data and the reference $V_T$ distribution data. The correlation function, when applied to the measured $V_T$ distribution data and the reference $V_T$ distribution data, produces an output value corresponding to the statistical correlation. Hence, as discussed herein, a "statistical correlation" comprises a value that indicates a statistical relationship between the measured $V_T$ distribution data and the reference $V_T$ distribution data. The heroic data recovery component 113 may further determine whether the statistical correlation satisfies a threshold condition. For example, the heroic data recovery component 113 may determine whether the statistical correlation exceeds a threshold correlation.

For some embodiments, comparing the measured $V_T$ distribution data with the reference $V_T$ distribution data includes accessing a look-up table (e.g., stored in local memory 119 or one of the memory devices 130 or 140). In an example, the look-up table may include multiple entries, where each entry corresponds to a particular memory device performance metric (e.g., a number of P/E cycles performed) and reference $V_T$ distribution data that corresponds to the performance metric. In this example, the heroic data recovery component 113 may identify the reference $V_T$ distribution data from an entry in the look-up table identified using an applicable performance metric of the memory device 200.

In another example, the look-up table comprises mappings between the one or more reference $V_T$ distributions and indications of whether to perform the one or more heroic data recovery processes. That is, each entry in the look-up table can comprise one or more reference $V_T$ distributions and an indication whether to perform the one or more heroic data recovery processes. The look-up table entries may, in some instances, specify a specific heroic data recovery process to perform. In accordance with this example, the heroic data recovery component 113 identifies an entry in the look-up table using the measured $V_T$ distribution data.

The heroic data recovery component 113 determines whether to perform one or more heroic data recovery processes on the block 202 based on a result of the comparison of the $V_T$ distribution data corresponding to the block and the reference $V_T$ distribution data (operation 210). In some instances, the heroic data recovery component 113 performs the one or more heroic data recovery processes on the block. In other instances, the heroic data recovery component 113 may forgo performing any heroic data recovery processes based on the comparison.

For some embodiments, performing the one or more heroic data recovery processes includes adjusting a location of one or more read reference values (e.g., by increasing or decreasing). That is, the heroic data recovery component 113 may increase or decrease one or more read reference voltage values based on the comparison of the measured $V_T$ distribution data with the reference $V_T$ distribution data. For example, based on a comparison of the measured $V_T$ distribution data with the reference $V_T$ distribution data, the heroic data recovery component 113 may shift the location of R1 (shown in graph 250) to the left by 5%. In doing so, the heroic data recovery component may adjust one or more systems settings that control read reference voltage values.

Figure 3:
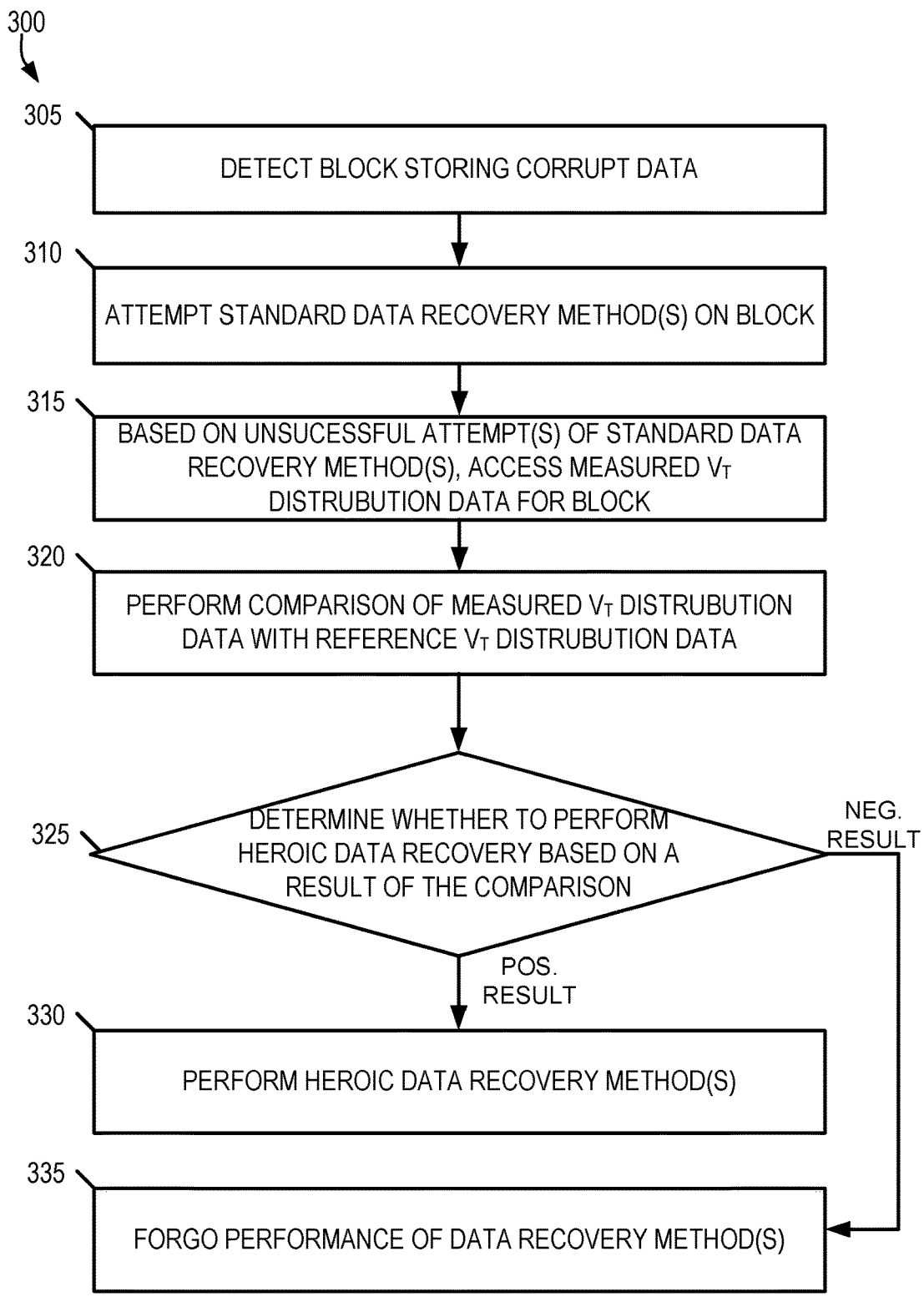
FIGS. 3-5 are flow diagrams illustrating an example method for selectively performing heroic data recovery processes in a memory device, in accordance with some embodiments of the present disclosure.
Figure 4:
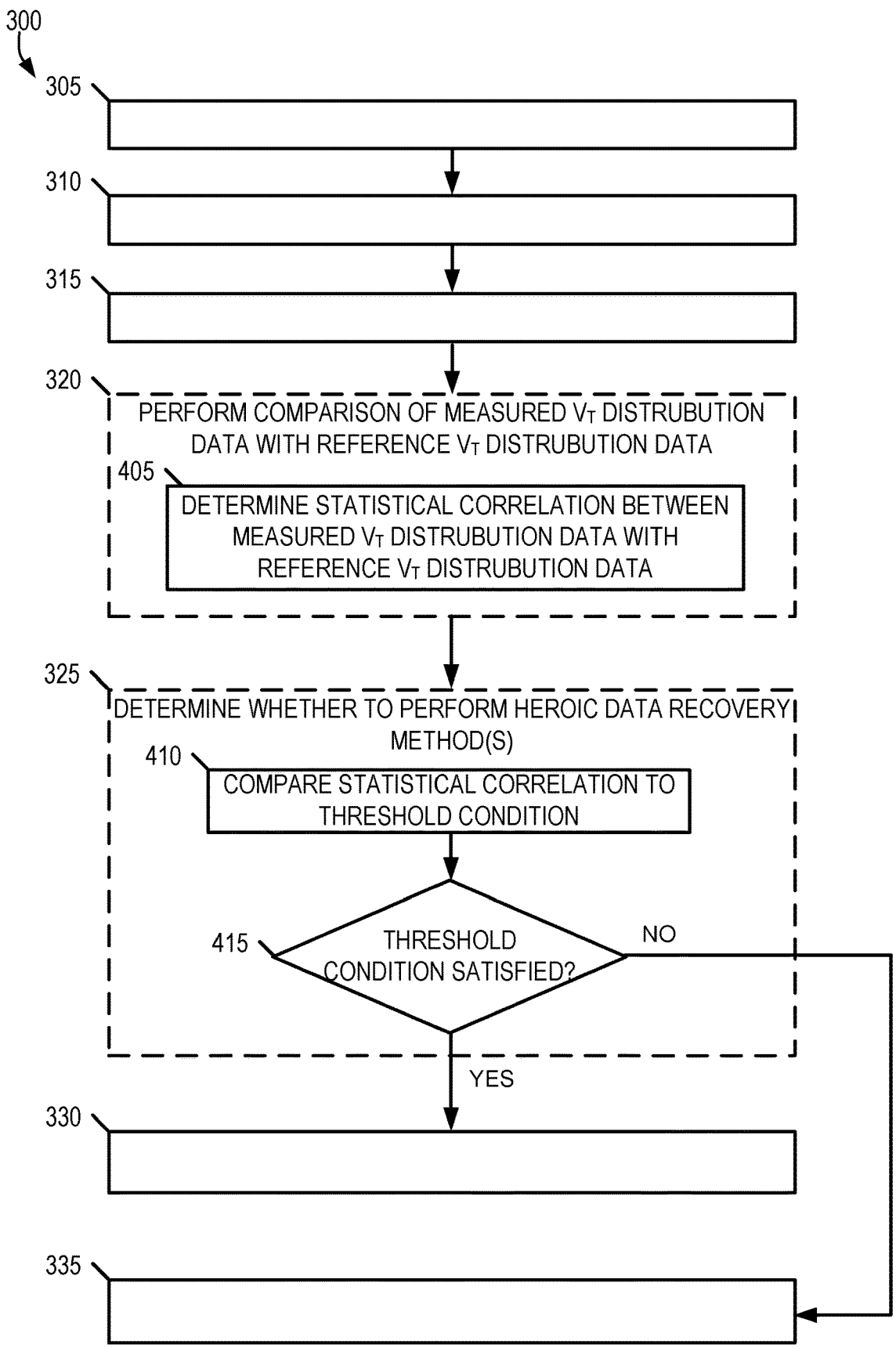
Figure 5:
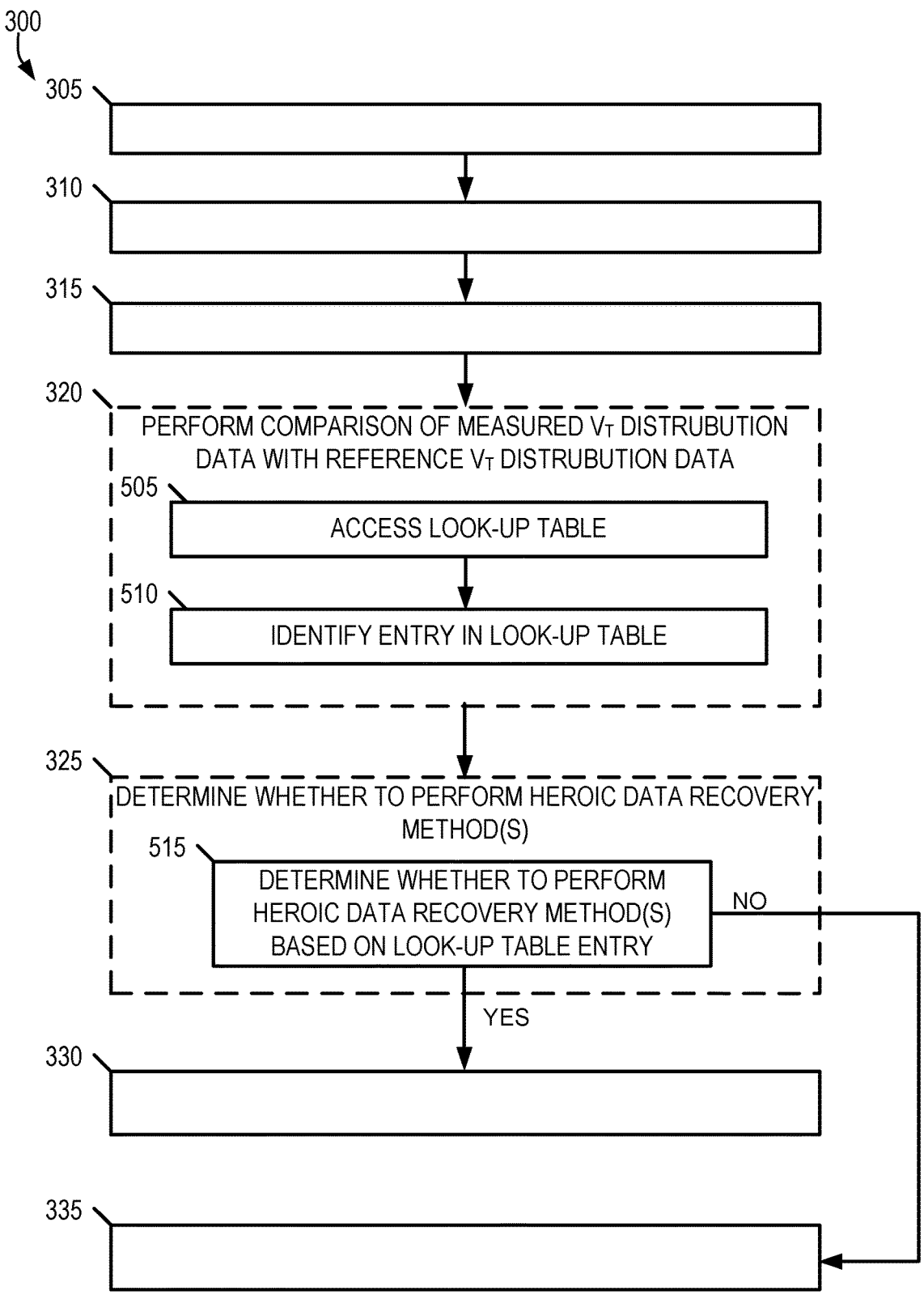

FIGS. 3-5 are flow diagrams illustrating an example method for selectively performing heroic data recovery processes in a memory device, in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the heroic data recovery component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 300 begins at operation 305, where the processing device detects a block storing corrupt data. The processing device may detect the block storing corrupt data based on performing a read operation on the block. At operation 310, the processing device attempts one or more standard data recovery processes on the block.

Based on the attempts at standard data recovery being unsuccessful, the processing device accesses threshold voltage $V_T$ distribution data corresponding to the block, at operation 315. The $V_T$ distribution data comprises one or more $V_T$ distribution measurements corresponding to the block. The processing device may access the $V_T$ distribution data from a log of $V_T$ distribution data generated during normal operation of the memory device.

At operation 320, the processing device performs a comparison of the measured $V_T$ distribution data with reference $V_T$ distribution data. The reference $V_T$ distribution data comprises one or more reference $V_T$ distributions. In comparing measured $V_T$ distribution data with reference $V_T$ distribution data, the processing device may determine a correlation or similarity between any one or more of: distribution shapes, distribution peaks, valley margin values, or valley margin shapes.

In comparing the measured data with the reference data, the processing device may further determine one or more similarity scores that provide a measure of similarity between any one or more of: distribution shapes, distribution peaks, valley margin values, or valley margin shapes. For some embodiments, the similarity score comprises a statistical correlation between one or more aspects of the measured $V_T$ distribution data and the reference $V_T$ distribution data. For some embodiments, the processing device may determine a composite similarity score based on an aggregate of similarity scores corresponding to a similarity of individual aspects of the measured $V_T$ distribution data and the reference $V_T$ distribution data (e.g., similarities between any one or more of distribution shapes, distribution peaks, valley margin values, or valley margin shapes). Further details regarding the comparison according to various embodiments are discussed below.

The processing device, at operation 325, determines whether to perform one or more heroic data recovery processes on the block based on a result of the comparison of the $V_T$ distribution data corresponding to the block and the reference $V_T$ distribution data. For example, the processing device may determine whether to perform one or more heroic data recovery processes on the block based on whether a similarity score generated as part of comparing the measure data with the reference data satisfies a threshold constraint (e.g., whether the similarity score exceeds a similarity threshold value).

As shown, based on a positive result of the comparison (e.g., the similarity score exceeding a similarity threshold value), the processing device may, in some instances, perform the one or more heroic data recovery processes on the block, at operation 330. In other instances, the processing device may forgo performing any heroic data recovery processes based on a negative result of the comparison (operation 335).

For some embodiments, in performing the one or more heroic data recovery processes, the processing device may adjust a location of one or more read reference values (e.g., by increasing or decreasing). That is, the processing device may increase or decrease one or more read reference voltage values based on the comparison of the measured $V_T$ distribution data with the reference $V_T$ distribution data. In doing so, the processing device may adjust one or more systems settings that control read reference voltage values. The processing device may adjust the location of a read reference value based on a similarity or correlation between any one or more of: distribution shapes, distribution peaks, valley margin values, or valley margin shapes.

As shown in FIG. 4, the method 300 may, in some embodiments, further include operations 405, 410, and 415. Consistent with these embodiments, the operation 405 can be performed as part of the operation 320, where the processing device performs the comparison of the $V_T$ distribution data corresponding to the block with reference $V_T$ distribution data. At operation 405, the processing device determines, using a correlation function, a statistical correlation between the $V_T$ distribution data corresponding to the block and the reference $V_T$ distribution data. Consistent with some embodiments, the processing device may determine statistical correlations on a per-level basis. That is, both the measured $V_T$ distribution data and the reference $V_T$ distribution data include a $V_T$ distribution for each level, and the processing device determines a statistical correlation between each level's measured $V_T$ distribution and reference $V_T$ distribution.

In an example, the measured $V_T$ distribution data includes N $V_T$ distribution measurements, where N corresponds to the number of charge levels of cells in the block and each $V_T$ distribution measurement corresponds to a particular level. That is, the measured $V_T$ distribution data can include: a first level $V_T$ distribution measurement, a second level $V_T$ distribution measurement, and so forth up to the Nth level. Similarly, the reference $V_T$ distribution data includes N $V_T$ distribution references where each $V_T$ distribution reference corresponds to a particular level (e.g., a first level $V_T$ distribution reference, a second level $V_T$ distribution reference, and so forth up to the Nth level). In this example, the determining of the statistical correlation may comprise determining a first correlation between the first level $V_T$ distribution measurement and the first level $V_T$ distribution reference, determining a second correlation between the second level $V_T$ distribution measurement and the second level $V_T$ distribution reference, and so forth, up to the Nth correlation. For some embodiments, the processing device aggregates N correlations to determine the statistical correlations, while in other embodiments, the statistical correlations includes the individual N correlations.

For some embodiments, in determining the statistical correlation, the processing device determines a correlation between one or more measured distribution peaks in the measured $V_T$ distribution data and one or more reference distribution peaks in the reference $V_T$ distribution data. For some embodiments, in determining the statistical correlation, the processing device determines a correlation between one or more measured valley margins in the $V_T$ distribution data corresponding to the block and one or more reference valley margins in the reference $V_T$ distribution data.

Consistent with these embodiments, the operations 410 and 415 can be performed as part of the operation 325 where the processing device determines whether to perform one or more heroic data recovery processes on the block. At operation 410, the processing device compares the statistical correlation to a threshold condition. The threshold condition may define a threshold correlation and in comparing the statistical correlation to the threshold condition, the processing device determines whether the correlation exceeds the threshold correlation.

At operation 415, the processing device determines whether to perform the one or more heroic data recovery processes on the block based on whether statistical correlation satisfies the threshold condition (e.g., whether the statistical correlation exceeds the threshold correlation. For example, in instances in which the correlation exceeds the threshold correlation (e.g., a high correlation), the processing device may perform the one or more heroic data recovery processes on the block (operation 330). In instances in which the correlation does not exceed the threshold correlation (e.g., a low correlation), the processing device may forgo performing any heroic data recovery processes based on the comparison (operation 335).

As shown in FIG. 5, the method 300 may, in some embodiments, further include operations 505, 510, and 515. Consistent with these embodiments, the operations 505 and 510 can be performed as part of the operation 320, where the processing device performs the comparison of the $V_T$ distribution data corresponding to the block with reference $V_T$ distribution data. At operation 505, the processing device accesses a look-up table. For some embodiments, the look-up table comprises mappings between the one or more reference $V_T$ distributions and indications of whether to perform the one or more heroic data recovery processes. That is, each entry in the look-up table can comprise one or more reference $V_T$ distributions and an indication whether to perform the one or more heroic data recovery processes. For some embodiments, entries in the look-up table may specify a specific heroic data recovery process to perform.

For some embodiments, the look-up table may include multiple entries, where each entry corresponds to a particular memory device performance metric (e.g., a number of program/erase (P/E) cycles performed) and reference $V_T$ distribution data that corresponds to the performance metric.

At operation 510, the processing device identifies an entry in the look-up table (e.g., using the measured $V_T$ distribution data). For some embodiments, the processing device may identify an entry with reference $V_T$ distribution data that matches the measured $V_T$ distribution data. Reference $V_T$ distribution data that matches the measured $V_T$ distribution data may be reference $V_T$ distribution data that is identical to the measured $V_T$ distribution data or reference $V_T$ distribution data that is within a predefined margin of the measured $V_T$ distribution data (e.g., determined based on a statistical correlation between the measured $V_T$ distribution data and the reference $V_T$ distribution data). For some embodiments, the heroic data recovery component 113 may identify an entry in the look-up table identified using an applicable performance metric of the memory device 200.

Consistent with these embodiments, the operation 515 can be performed as part of the operation 325 where the processing device determines whether to perform one or more heroic data recovery processes on the block. At operation 515, the processing device determines whether to perform one or more heroic data recovery processes on the block based on the entry in the look-up table. For some embodiments, the processing device determines whether to perform one or more heroic data recovery processes on the block based on the indication in the entry. For some embodiments, the processing device determines whether to perform one or more heroic data recovery processes on the block based on a comparison of the measured $V_T$ distribution data with reference $V_T$ distribution data included in the identified entry (e.g., based on a statistical correlation between the measured $V_T$ distribution data and the reference $V_T$ distribution data).

As noted above, for some embodiments, the entry in the look-up table may further specify a particular heroic data recovery process to perform. Consistent with these embodiments, the processing device may further determine which heroic data recovery process to perform, at operation 515.

For some embodiments, the look-up table may include entries only for reference $V_T$ distribution data for which heroic data recovery processes are likely to be successful. Consistent with these embodiments, the processing device may be unable to identify an entry in the look-up table and in these instances, the processing device foregoes performing heroic data recovery processes.

Described implementations of the subject matter can include one or more features, alone or in combination as illustrated below by way of example.

Example 1. A memory sub-system comprising: a memory device comprising a set of blocks; and a processing device, operatively coupled with the memory device, to perform operations comprising: detecting a block storing corrupt data; based on detecting the block storing corrupt data, accessing threshold voltage ($V_T$) distribution data corresponding to the block, the $V_T$ distribution data comprising one or more $V_T$ distribution measurements corresponding to the block; performing a comparison of the $V_T$ distribution data corresponding to the block with reference $V_T$ distribution data, the reference $V_T$ distribution data comprising one or more reference $V_T$ distributions; and determining whether to perform one or more heroic data recovery processes on the block based on a result of the comparison of the $V_T$ distribution data corresponding to the block and the reference $V_T$ distribution data.

Example 2. The memory sub-system of Example 1, wherein the operations further comprise: performing the one or more heroic data recovery processes on the block based on the comparison.

Example 3. The memory sub-system of any one or more of Examples 1 or 2, wherein the operations further comprise: foregoing performing the one or more heroic data recovery processes on the block based on the comparison.

Example 4. The memory sub-system of any one or more of Examples 1-3, wherein: performing the comparison comprises determining, using a correlation function, a statistical correlation between the $V_T$ distribution data corresponding to the block and the reference $V_T$ distribution data; and determining whether to perform one or more heroic data recovery processes on the block comprises determining whether to perform one or more heroic data recovery processes based on the statistical correlation.

Example 5. The memory sub-system of any one or more of Examples 1-4, wherein: the $V_T$ distribution data comprises: a first level $V_T$ distribution measurement; and a second level $V_T$ distribution measurement; the reference $V_T$ distribution data comprises: a first level $V_T$ distribution reference; and a second level $V_T$ distribution reference; the determining of the statistical correlation between the $V_T$ distribution data corresponding to the block and the reference $V_T$ distribution data comprises: determining a first correlation between the first level $V_T$ distribution measurement and the first level $V_T$ distribution reference; and determining a second correlation between the second level $V_T$ distribution measurement and the second level $V_T$ distribution reference.

Example 6. The memory sub-system of any one or more of Examples 1-5, wherein the determining of the statistical correlation between the $V_T$ distribution data corresponding to the block and the reference $V_T$ distribution data comprises: determining the statistical correlation between one or more measured distribution peaks in the $V_T$ distribution data corresponding to the block and one or more reference distribution peaks in the reference $V_T$ distribution data.

Example 7. The memory sub-system of any one or more of Examples 1-6, wherein the determining of the statistical correlation between the $V_T$ distribution data corresponding to the block and the reference $V_T$ distribution data comprises: determining the statistical correlation between one or more measured valley margins in the $V_T$ distribution data corresponding to the block and one or more reference valley margins in the reference $V_T$ distribution data.

Example 8. The memory sub-system of any one or more of Examples 1-7, wherein the performing of the comparison comprises: accessing a look-up table comprising mappings between the one or more reference $V_T$ distributions and indications of whether to perform the one or more heroic data recovery processes; and identifying an entry in the look-up table based on the $V_T$ distribution data corresponding to the block.

Example 9. The memory sub-system of any one or more of Examples 1-8, wherein the determining whether to perform one or more heroic data recovery processes on the block comprises determining whether to perform the one or more heroic data recovery processes based on the entry.

Example 10. The memory sub-system of any one or more of Examples 1-9, wherein the operations further comprise adjusting one or more read reference voltage values based on the comparison.

Example 11. The memory sub-system of any one or more of Examples 1-10, wherein accessing the $V_T$ distribution data comprises accessing a log of $V_T$ distribution data.

Example 12. A method comprising: detecting a block storing corrupt data; based on detecting the block storing corrupt data, accessing threshold voltage ($V_T$) distribution data corresponding to the block, the $V_T$ distribution data comprising one or more $V_T$ distribution measurements corresponding to the block; performing a comparison of the $V_T$ distribution data corresponding to the block with reference $V_T$ distribution data, the reference $V_T$ distribution data comprising one or more reference $V_T$ distributions; and determining whether to perform one or more heroic data recovery processes on the block based on a result of the comparison of the $V_T$ distribution data corresponding to the block and the reference $V_T$ distribution data.

Example 13. The method of Example 12, further comprising: performing the one or more heroic data recovery processes on the block based on the comparison.

Example 14. The method of any one or more of Examples 12 or 13, further comprising: foregoing performing the one or more heroic data recovery processes on the block based on the comparison.

Example 15. The method of any one or more of Examples 12-14, further comprising: performing the comparison comprises determining, using a correlation function, a statistical correlation between the $V_T$ distribution data corresponding to the block and the reference $V_T$ distribution data; and determining whether to perform one or more heroic data recovery processes on the block comprises determining whether to perform one or more heroic data recovery processes based on the statistical correlation.

Example 16. The method of any one or more of Examples 12-15, wherein: the $V_T$ distribution data comprises: a first level $V_T$ distribution measurement; and a second level $V_T$ distribution measurement; the reference $V_T$ distribution data comprises: a first level $V_T$ distribution reference; and a second level $V_T$ distribution reference; the determining of the statistical correlation between the $V_T$ distribution data corresponding to the block and the reference $V_T$ distribution data comprises: determining a first correlation between the first level $V_T$ distribution measurement and the first level $V_T$ distribution reference; and determining a second correlation between the second level $V_T$ distribution measurement and the second level $V_T$ distribution reference.

Example 17. The method of any one or more of Examples 12-16, wherein the determining of the statistical correlation between the $V_T$ distribution data corresponding to the block and the reference $V_T$ distribution data comprises: determining the statistical correlation between one or more measured distribution peaks in the $V_T$ distribution data corresponding to the block and one or more reference distribution peaks in the reference $V_T$ distribution data.

Example 18. The method of any one or more of Examples 12-17, wherein the determining of the statistical correlation between the $V_T$ distribution data corresponding to the block and the reference $V_T$ distribution data comprises: determining the statistical correlation between one or more measured valley margins in the $V_T$ distribution data corresponding to the block and one or more reference valley margins in the reference $V_T$ distribution data.

Example 19. The method of any one or more of Examples 12-18, wherein the performing of the comparison comprises: accessing a look-up table comprising mappings between the one or more reference $V_T$ distributions and indications of whether to perform the one or more heroic data recovery processes; and identifying an entry in the look-up table based on the $V_T$ distribution data corresponding to the block.

Example 20. A non-transitory computer-readable storage medium comprising instructions that, when executed by a processing device, configure the processing device to perform operations comprising: detecting a block storing corrupt data; based on detecting the block storing corrupt data, accessing threshold voltage ($V_T$) distribution data corresponding to the block, the $V_T$ distribution data comprising one or more $V_T$ distribution measurements corresponding to the block; performing a comparison of the $V_T$ distribution data corresponding to the block with reference $V_T$ distribution data, the reference $V_T$ distribution data comprising one or more reference $V_T$ distributions; and determining whether to perform one or more heroic data recovery processes on the block based on a result of the comparison of the $V_T$ distribution data corresponding to the block and the reference $V_T$ distribution data.

Figure 6:
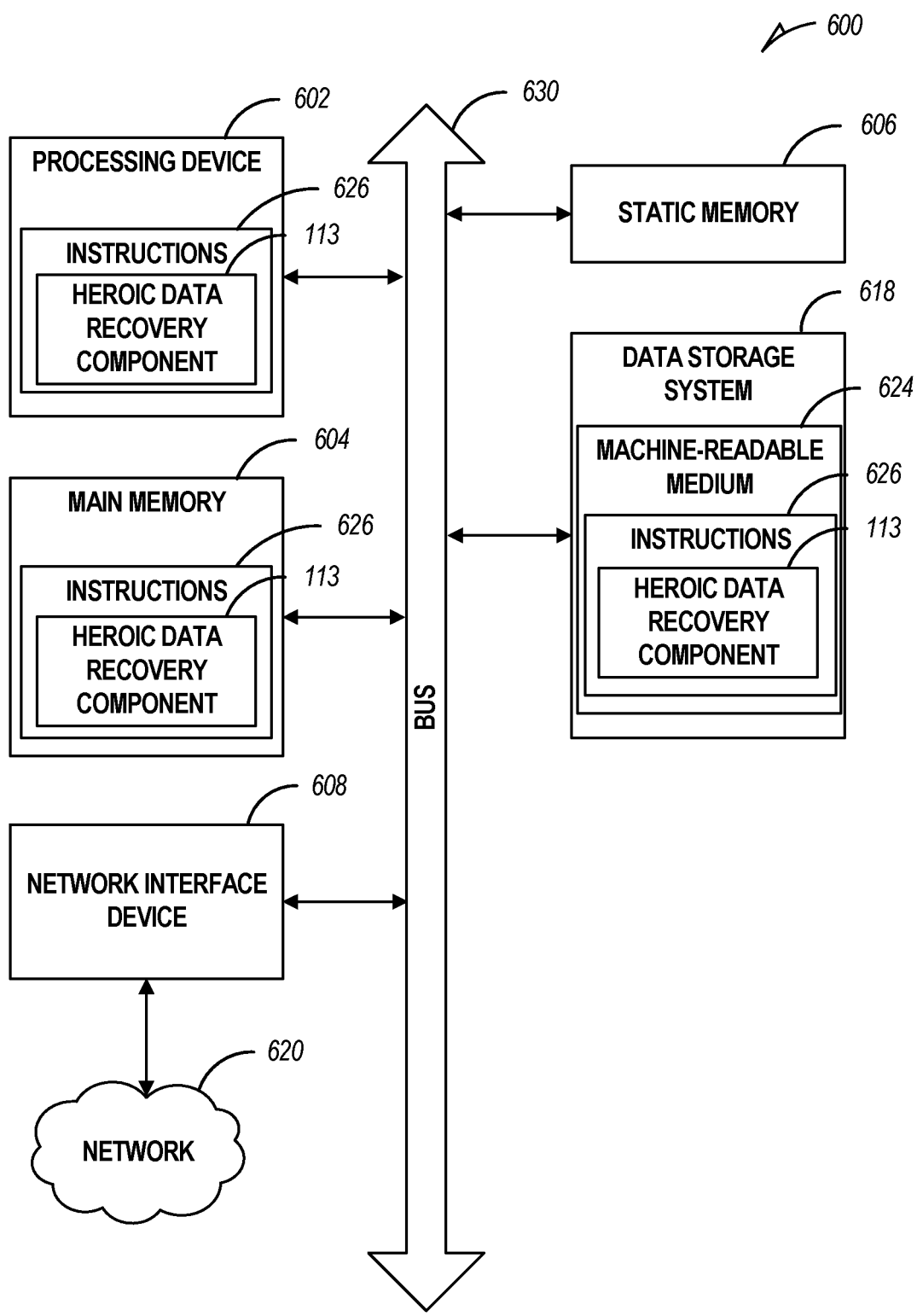
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the heroic data recovery component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an ASIC, a FPGA, a digital signal processor (DSP), network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a data destruction component (e.g., the heroic data recovery component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
a memory device comprising a set of blocks; and
a processing device, operatively coupled with the memory device, to perform operations comprising:
detecting a block storing corrupt data;
based on detecting the block storing corrupt data, determining whether to perform one or more heroic data recovery processes on the block based on a statistical correlation between reference $V_T$ distribution data and $V_T$ distribution data corresponding to the block, the $V_T$ distribution data comprising one or more $V_T$ distribution measurements corresponding to the block, the one or more $V_T$ distribution measurements including a measured $V_T$ of a memory cell in the block, data stored by the memory cell being based on the measured $V_T$ of the memory cell, the reference $V_T$ distribution data comprising one or more reference $V_T$ distributions.

2. The memory sub-system of claim 1, wherein the operations comprise:
performing the one or more heroic data recovery processes on the block based on the $V_T$ distribution data.

3. The memory sub-system of claim 1, wherein the operations comprise:
foregoing performing the one or more heroic data recovery processes on the block based on the $V_T$ distribution data.

4. The memory sub-system of claim 1, wherein the operations comprise:
determining, using a correlation function, the statistical correlation between the $V_T$ distribution data and reference $V_T$ distribution data.

5. The memory sub-system of claim 4, wherein:
the $V_T$ distribution data comprises:
a first level $V_T$ distribution measurement; and
a second level $V_T$ distribution measurement;
the reference $V_T$ distribution data comprises:
a first level $V_T$ distribution reference; and
a second level $V_T$ distribution reference;
the determining of the statistical correlation between the $V_T$ distribution data corresponding to the block and the reference $V_T$ distribution data comprises:
determining a first correlation between the first level $V_T$ distribution measurement and the first level $V_T$ distribution reference; and
determining a second correlation between the second level $V_T$ distribution measurement and the second level $V_T$ distribution reference.

6. The memory sub-system of claim 4, wherein the determining of the statistical correlation between the $V_T$ distribution data corresponding to the block and the reference $V_T$ distribution data comprises:
determining the statistical correlation between one or more measured distribution peaks in the $V_T$ distribution data corresponding to the block and one or more reference distribution peaks in the reference $V_T$ distribution data.

7. The memory sub-system of claim 4, wherein the determining of the statistical correlation between the $V_T$ distribution data corresponding to the block and the reference $V_T$ distribution data comprises:
determining the statistical correlation between one or more measured valley margins in the $V_T$ distribution data corresponding to the block and one or more reference valley margins in the reference $V_T$ distribution data.

8. The memory sub-system of claim 1, wherein the operations comprise:
accessing a look-up table comprising mappings between one or more reference $V_T$ distributions and indications of whether to perform the one or more heroic data recovery processes; and
identifying an entry in the look-up table based on the $V_T$ distribution data corresponding to the block.

9. The memory sub-system of claim 8, wherein the entry comprises the reference $V_T$ distribution data.

10. The memory sub-system of claim 1, wherein the operations comprise adjusting one or more read reference voltage values based on the $V_T$ distribution data.

11. The memory sub-system of claim 1, wherein the operations comprise accessing the $V_T$ distribution data from a log of $V_T$ distribution data.

12. A method comprising:
detecting, by a processing device, a block in a memory device storing corrupt data; and
based on detecting the block storing corrupt data, determining, by the processing device, whether to perform one or more heroic data recovery processes on the block based on a statistical correlation between reference $V_T$ distribution data and $V_T$ distribution data corresponding to the block, the $V_T$ distribution data comprising one or more $V_T$ distribution measurements corresponding to the block, the one or more $V_T$ distribution measurements including a measured $V_T$ of a memory cell in the block, data stored by the memory cell being based on the measured $V_T$ of the memory cell, the reference $V_T$ distribution data comprising one or more reference $V_T$ distributions.

13. The method of claim 12, comprising:
performing the one or more heroic data recovery processes on the block based on the $V_T$ distribution data.

14. The method of claim 12, comprising:
foregoing performing the one or more heroic data recovery processes on the block based on the $V_T$ distribution data.

15. The method of claim 12, comprising:
determining, using a correlation function, a statistical correlation between the $V_T$ distribution data and reference $V_T$ distribution data.

16. The method of claim 15, wherein:
the $V_T$ distribution data comprises:
a first level $V_T$ distribution measurement; and
a second level $V_T$ distribution measurement;
the reference $V_T$ distribution data comprises:
a first level $V_T$ distribution reference; and
a second level $V_T$ distribution reference;
the determining of the statistical correlation between the $V_T$ distribution data corresponding to the block and the reference $V_T$ distribution data comprises:
determining a first correlation between the first level $V_T$ distribution measurement and the first level $V_T$ distribution reference; and
determining a second correlation between the second level $V_T$ distribution measurement and the second level $V_T$ distribution reference.

17. The method of claim 15, wherein the determining of the statistical correlation between the $V_T$ distribution data corresponding to the block and the reference $V_T$ distribution data comprises:
determining the statistical correlation between one or more measured distribution peaks in the $V_T$ distribution data corresponding to the block and one or more reference distribution peaks in the reference $V_T$ distribution data.

18. The method of claim 15, wherein the determining of the statistical correlation between the $V_T$ distribution data corresponding to the block and the reference $V_T$ distribution data comprises:
determining the statistical correlation between one or more measured valley margins in the $V_T$ distribution data corresponding to the block and one or more reference valley margins in the reference $V_T$ distribution data.

19. The method of claim 12, comprising:
accessing a look-up table comprising mappings between one or more reference $V_T$ distributions and indications of whether to perform the one or more heroic data recovery processes; and
identifying an entry in the look-up table based on the $V_T$ distribution data corresponding to the block.

20. A non-transitory computer-readable storage medium comprising instructions that, when executed by a processing device, configure the processing device to perform operations comprising:
detecting a block in a memory device storing corrupt data; and
based on detecting the block storing corrupt data, determining whether to perform one or more heroic data recovery processes on the block based on a statistical correlation between reference $V_T$ distribution data and $V_T$ distribution data corresponding to the block, the $V_T$ distribution data comprising one or more $V_T$ distribution measurements corresponding to the block, the one or more $V_T$ distribution measurements including a measured $V_T$ of a memory cell in the block, data stored by the memory cell being based on the measured $V_T$ of the memory cell, the reference $V_T$ distribution data comprising one or more reference $V_T$ distributions.

* * * * *